Dec. 19, 1933.   F. H. WAGNER   1,940,198
APPARATUS FOR CLEANING GAS
Filed Jan. 27, 1932
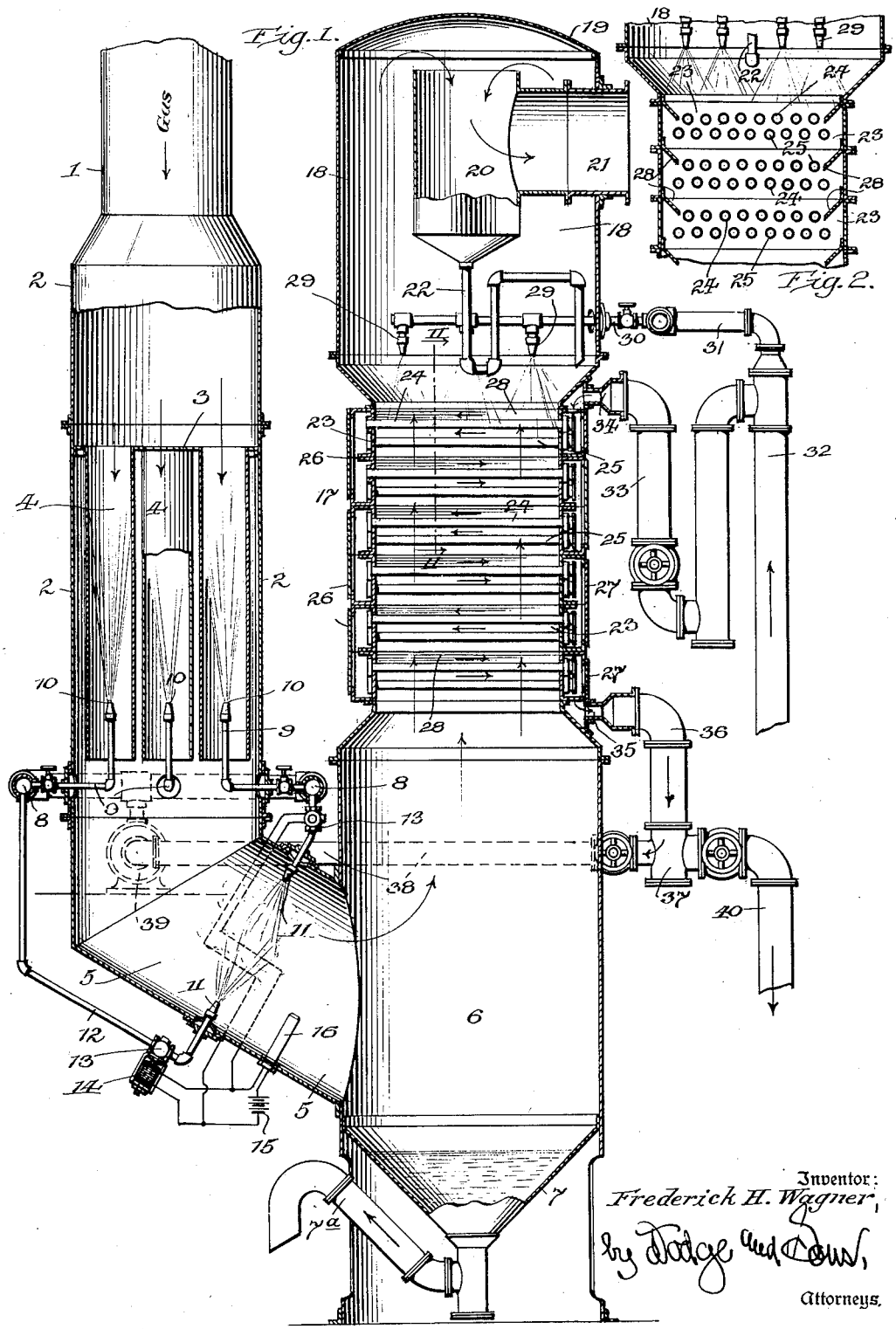

Patented Dec. 19, 1933

1,940,198

UNITED STATES PATENT OFFICE 1,940,198

APPARATUS FOR CLEANING GAS

Frederick H. Wagner, Baltimore, Md.

Application January 27, 1932. Serial No. 589,253

10 Claims. (Cl. 183—23)

This invention pertains to an improved apparatus for cleaning gas and has to do more particularly with the removal of dust particles and fumes in the form of metallic vapors from furnace gases.

A structure embodying the invention is illustrated in the annexed drawing, wherein:

Fig. 1 is a vertical sectional view of the apparatus; and

Fig. 2, a detail sectional view of the condensing chamber taken on the line II—II of Fig. 1.

The main object of the invention is to provide an apparatus which will denude the gas of substantially all foreign matter, such as dust particles and fumes in the form of metallic vapors, and this through a simple apparatus which is preferably free of moving parts other than a pump (or pumps) employed to produce the necessary water sprays.

The apparatus is such that the gas undergoing treatment is first subjected to a spray of hot water in a saturating chamber, just sufficient water being supplied and vaporized to establish and maintain the desired dew point. The water, during this portion of the treatment, as will be more fully hereinafter set forth, is electrically charged and this condition has a direct effect in assisting the removal of the foreign bodies from the gas stream. The gas, after being subjected to the spraying treatment is led into an expansion chamber having a larger capacity than that of the saturating chamber. Upon entering the former the velocity of the gas is immediately decreased and this is accompanied by almost instantaneous shrinkage in volume thereof by reason of the lowering of the temperature of the gas. The reduction in velocity allows some of the heavier wetter particles to settle out of the gas stream by gravity. Moving on, the gas is forced or drawn through a surface condenser, the elements whereof, as well as the on-coming gas, are subjected to a flow of water, preferably in the form of spray. Finally, water entrained by the cleaned gas is removed therefrom and the gas passed out of the apparatus.

In the drawing, 1 denotes the gas inlet conduit, said member being in direct communication with a saturating chamber 2 in which is secured a transverse diaphragm 3 forming the support for a series of spaced tubes 4 open at their upper and lower ends.

The lower end of the saturating chamber 2 is connected, as by a lateral duct 5, with the lower portion of an expansion chamber 6. The bottom 7 of said chamber is preferably funnel-shaped and has connected to its lower end a siphon off-take 7ᵃ for water and entrained dust particles.

Surrounding the saturating chamber 2, adjacent the plane of the lower ends of tubes or conduits 4, is a header 8 into which are connected valved pipes, as 9, said pipes extending inwardly of the chamber 2. Each of said pipes terminates in a spray nozzle 10 which is so formed and directed as to throw a spray of water upwardly within the conduit and through the down-coming gas stream. The presence of the tubes, while not absolutely essential from a generic standpoint, is preferred for they tend to bring the gas and water into intimate contact, securing a thorough intermingling through the turbulence set up within the tubes. Their presence not only prevents channeling of the gas into streams outside the direct influence of the upthrown sprays but also assists in bringing about certain electrical effects.

The degree of fineness to which the water can be brought depends, of course, upon the capacity of the nozzles and the hydraulic pressure employed. With constant pressure, small nozzle capacity, and small nozzle bore the finest spray is produced.

Since adsorption is a specific phenomenon, depending upon the nature of the adsorbing and adsorbed substances, the particles of the dispersed phase (dust-fume) will adsorb positive or negative ions from the gaseous dispersion medium, and the existence of such films of adsorbed molecules or ions profoundly affects the behavior and stability of the dispersion system. Such absorbed films may be protective and, by preventing the coalescence or adhesion of the particles, they may greatly increase the stability of the system and hence make the removal of the protected nuclei rather difficult, because they cannot be wetted unless their electric sign is changed. On the other hand, if ions of opposite sign are adsorbed by different particles of the disperse phase, the electrical forces that are set up between oppositely charged particles would rapidly cause coalescence or flocculation, and thus reduce the stability of the system.

In practically all smokes or fumes a portion of the particles are electrically charged. These particles may become charged by contact with the dispersion medium (gas), possibly on account of the specific adsorption of gas ions at the surface of the particles. When water is atomized in a gas the increase of specific surface is generally associated with the electrification of the droplets, this charge being positive, leaving a negative charge in the gas, hence negatively charged particles will condense more readily on the positively charged water droplets, and the positively charged particles will lose their charge through contact with the negatively charged gas. It is therefore obvious that even the positive charged particles, after losing their charge to the negative charged gas, are prepared to be wetted by the positively charged water droplet, consequently by this arrangement both positively and negatively charged particles can be wetted by condensation and be removed from the gas.

Due to the friction of the water at the spray nozzle and on the surrounding gas or atmosphere an electric charge is produced in the disintegrated water. The charge is also brought about in part through the condensing effect of the spray, the amount of current produced depending upon the degree of disintegration of the water.

The effect of distance between the tube wall and the spray is illustrated by the following example: With 3 atmospheres of pressure the 0.3 mm. bore bronze spray gave 35 volts at a distance of 12 inches from the wall, while the same spray and same pressure gave only 15 volts with a distance of 30 inches from the wall. This electric charge is thus due to:

(1) Friction of the water on the spray nozzle;
(2) Friction of the water in the surrounding atmosphere;
(3) Condensing effect of the disintegrated water; and
(4) Lenard effect.

The total charge is therefore the sum of these four effects, but only the first three came into actual production of the charge;—this because the Lenard effect is dependent upon the kinetic energy of the water droplet and hence practically depends upon the applied pressure and the distance of the spray from the wall. There is a maximum distance from the tube wall for each size spray, and this distance is in turn dependent upon the angle of the spray, upon the velocity of the water droplet, and upon the size of the latter. Smaller droplets lose their kinetic energy, and hence their striking force, on account of the frictional resistance of the atmosphere, quicker than do larger droplets. Consequently, with a higher applied pressure (greater kinetic energy) of the droplet, the distance for the maximum value of the Lenard effect also is greater.

When the maximum allowable distance between the wall and the spray is exceeded, the voltage of the current produced decreases, or the voltage remains constant at about $4/5$ of the maximum. In this case the energy delivered by the Lenard effect is less, but, due to the friction of the water on the atmosphere and to its condensing effect, the charge created is somewhat increased, or until the two opposites balance each other. These values are then a measure of the charge carried in the water droplets exclusive of the energy effected by collision with the wall of the tube.

When the spray nozzles have a greater capacity in gallons per minute the charge in the disintegrated water itself is less, while the Lenard effect, due to the greater force of collision, increases and especially so with small spray-cone angles.

In actual practice spray nozzles produced from ceramic material have been found advantageous over those formed from metal. For example, with a ceramic body and a bronze spray tip the charge measured 170 volts, while with the same water capacity, and under the same pressure, the charge from an all bronze spray gave only 145 volts.

Just sufficient water is vaporized into the gas in the saturating chamber 2 to maintain the desired dew point. If, however, such dew point is not attained supplemental nozzles or sprays, as 11, working in the lateral connection or conduit 5 may be employed. Preferably these nozzles 11 will be subject to thermostatic control so as to make the apparatus self regulating. They are connected to the header 8 through suitable valved pipes 12, the valves being denoted by 13 and being subject to opening through the operation of an electric motor such as a solenoid 14, the windings whereof are connected into a line or circuit including a battery 15 and a thermostatic element 16 extending inwardly of the gas passage 5.

Surmounting the chamber 6, and in direct communication therewith, is a condenser denoted generally by 17, the upper end of which opens into an off-take chamber 18. The top 19 of the chamber 18 is preferably rounded and overlies a centrally disposed receptacle 20 having a lateral gas outlet 21. Said chamber 20 has secured to its lower end a trapped drain pipe 22, the open end of which discharges into the condenser 17. The condenser will preferably be of the tubular type thereby providing a large area of contact. In the form shown it is made up of a series of superimposed sections denoted generally by 23, six of said sections being shown in Fig. 1. It will be understood, of course, that any number may be employed so long as they provide a sufficient area of contact. Each condenser element 23 is shown as carrying two horizontally disposed rows of tubes 24 and 25, the tubes in one row being staggered in relation to those in the other so as to produce a circuitous path through which the up-going gas stream must pass. As will be seen upon reference to Fig. 1, the sections 23 are alternately connected at their ends by closure plates 26 and 27 forming passages which cause the water introduced thereto to flow through the tubes in the direction indicated by the arrows in said figure.

As will be seen upon reference to Fig. 2, the lower edge of each of the condenser elements 23 is provided with an inwardly and downwardly extending flange or lip 28 which acts to deflect the gas inwardly and prevent its traveling up along the outer walls of the condenser and likewise throws the water inwardly onto the pipes as such water passes down through the condenser. The water is sprayed into the lower portion of the chamber 18 from a series of nozzles, as 29, connected to a valved pipe 30 which in turn is connected into a branch pipe 31. Said latter pipe is in communication with the cold water main 32, the latter also being in direct communication through a valved pipe 33 with a fitting or member 34 which communicates with the uppermost condenser element. At the lower end of such elements there is a second fitting or casting 35 which is in direct communication with the lowermost condenser element, or the chamber formed at the outer end thereof by the right hand closure plate 27. The fitting 35 is in turn connected with an off-take pipe 36 for the hot water, the pipe extending into a T 37, one branch of which is connected to a pipe 38 leading to a pump 39 which forces the hot water into the header 8 and through the nozzles 10. The opposite branch of the T 37 is connected to a valved off-take pipe 40 and through which the system may be drained when the valves are all open.

The arrangement of the condenser is such that the up-going gas stream is thoroughly broken up and comes into intimate contact with the cold water which is being sprayed downwardly from the nozzles 29. The water, in addition to cooling the gas, washes the pipes so as to keep them clean and clear of any accumulated matter.

Operation of the nozzles 29 to produce water spray in the condensing unit need not be continuous since it is possible that if the water passing through the tubes 24 is cold enough they will effect the necessary cooling. Under such conditions the nozzles would be turned on intermittently to wash accumulated dust from the tubes.

In operation the gas which may have been passed through some dry-cleaning apparatus is forced or drawn into the pipe 1, carrying therewith finely divided dust particles and also fumes in the form of metallic vapors, and proceeds down through the pipe to the saturating chamber 2, thence into and through the tubes 4 thereof. In passing down through the tubes 4 the gas comes into contact with the hot water from the spray nozzles 10 and just sufficient water is vaporized into the gas at this point to attain the desired dew point. If, however, for any reason this dew point is not attained the nozzles 11 will automatically come into action to supply the additional water vapor needed to thoroughly wet the dust particles.

Passing from the branch or lateral 5 the gas enters the chamber 6 where its velocity decreases and its temperature starts to drop. At this stage certain of the heavier wetted particles will fall into the bottom 7 by reason of gravity.

Passing upwardly from the chamber 6 the gas enters the chamber 17, passing around and about the tubes which are filled with cold water and meeting the cold water spray from the nozzles 29. The water from these nozzles not only assists in cooling the gas but, as above noted, also acts to keep the outer surface of the tubes clean.

In passing upwardly through the condenser and in contacting the cold pipes 24, 25 and the cold spray from the nozzles 29, the gas will be reduced in temperature. Such cooling causes condensation of the moisture about the dust particles as nuclei and also condenses the fumes contained in the gas. The substances thus affected are carried downwardly through the expansion chamber into the bottom 7 where they pass off through the siphon 7ª.

After passing into the chamber 18 the gas takes the path indicated by the arrows. That is to say, it passes upwardly around the chamber 20 and is thrown or drawn inwardly thereof by the curved top 19, eventually leaving the apparatus through the outlet 21.

Most, if not all, of any water particles which may be entrained by the upgoing cleaned gas stream will be caught in the receptacle 20 and passed downwardly through the trapped outlet pipe 22.

From the foregoing it will be seen that I have provided a relatively simple apparatus, insofar as the gas cleaning operations per se are concerned, which involves no movable elements and hence consumes but little if any power other than that sufficient to insure the flow of gas therethrough. It is necessary of course to have the water supply under pressure and as to this the cold water main 32 may be connected into the ordinary service supply while but a single pump, at 39, is necessary to insure the proper pressure to the nozzle feeding the header 8. So too the water flowing through the condenser is heated by the gas and is utilized in the sprays 10 to secure saturation of the gas undergoing treatment.

What is claimed is:

1. In an apparatus of the character described, the combination of a saturating chamber; a condenser; an expansion chamber of a volume exceeding that of the saturating chamber interposed between and connecting said saturating chamber and condenser; means for spraying electrified hot water particles into the gas as it passes through the saturating chamber; and automatic means for maintaining the gas passing through the expansion chamber saturated at a temperature above the dew point of the saturating medium.

2. A structure as set forth in claim 1, wherein the hot water used in the saturating chamber is derived from the outflow of the condenser.

3. In an apparatus of the character specified, the combination of a saturating chamber; a plurality of vertically disposed spaced tubes mounted therein and through which the gas to be cleaned is caused to pass; an electrifying water spray nozzle within and cooperating with each of said tubes; an expansion chamber into which the gas passed from said saturating chamber; means for automatically controlling the moisture content of the gas passing through the expansion chamber; a condenser of the tubular type connected to the discharge of the expansion chamber; and means for spraying water downwardly through the condenser and the expansion chamber.

4. A dust extracting apparatus comprising a source of dusty gas under pressure; a plurality of tubes for separating the main gas stream into a plurality of smaller streams; a source of water under pressure; a spray nozzle in each of said tubes and connected with said source of water for atomizing the water, said nozzles being constructed and arranged to charge the water particles electrically, and thereby facilitate condensation of water by the attraction between the charged water particles and the charged dust particles in the gas; and means for condensing the water vapor to remove the dust particles from the gas.

5. An apparatus as set forth in claim 4, wherein the nozzles spray the water in a direction counter-current to the flow of the gas.

6. An apparatus as set forth in claim 4, wherein the gas flows through the tubes in counter-current to the spray emanating from the nozzles and in which the spray is thrown outwardly against the walls of the tubes.

7. A nebulizer for dust extracting apparatus comprising a source of dusty gas under pressure; a chamber to which the gas passes, said chamber containing a plurality of tubes for separating the gas stream into a plurality of smaller streams; a source of water under pressure; and an atomizing spray nozzle disposed within each of said tubes and connected to the source of water, said sprays being so constructed and arranged with reference to the walls of said tubes as to impart to the water particles an electrical charge in excess of 150 volts.

8. Dust extracting apparatus comprising a chamber to which gas containing dust particles is supplied under pressure; means for saturating the gas with electrically charged particles of water vapor, said means comprising a plurality of tubes for dividing the main gas stream into smaller streams, and an atomizing spray nozzle within each of said tubes and constructed and arranged to impart to the fine water particles an electrical charge in excess of 150 volts; and means comprising a condenser for causing supersaturation of the gas and separating the dust therefrom.

9. In an apparatus of the character described, the combination of a saturating chamber; a condenser; an expansion chamber interposed between and connecting said saturating chamber and the condenser; means within the saturating chamber for saturating the gas with electrically charged water particles at a temperature above the dew point of the water; automatic means in said expansion chamber for supplying fine electrically charged water particles to the gas to maintain the desired dew point of the gas after expansion; and means for subjecting the gas as it passes from the expansion chamber and the condenser to the action of a cold water spray to cause supersaturation of the gas.

10. In an apparatus of the character described, the combination of a saturating chamber comprising a plurality of vertically disposed tubular members and a nozzle within each of said tubes; means for spraying water through the nozzles, said nozzles being so constructed and arranged with reference to the tube walls as to impart an electrical charge to the water particles; an expansion chamber communicating with the discharge of said saturating chamber; means within the expansion chamber for controlling the temperature of the gas expanded therein; and a condenser in communication with the outlet of said expansion chamber.

FREDERICK H. WAGNER.